United States Patent [19]
Yang

[11] Patent Number: 6,078,266
[45] Date of Patent: Jun. 20, 2000

[54] INTEGRATED CIRCUIT CARD TYPE CAR AUDIO SYSTEM AND OPERATING METHOD THEREOF

[75] Inventor: Jun-Hae Yang, Incheon, Rep. of Korea

[73] Assignee: Daewoo Electronics Co., Ltd., Seoul, Rep. of Korea

[21] Appl. No.: 09/049,133

[22] Filed: Mar. 27, 1998

[30] Foreign Application Priority Data

Mar. 28, 1997 [KR] Rep. of Korea ............ 97-11039

[51] Int. Cl.$^7$ ................................... G06F 7/04
[52] U.S. Cl. ................... 340/825.31; 340/825.34; 340/426; 235/380; 235/492; 455/186.1; 455/345; 455/347; 455/348
[58] Field of Search ............. 340/825.31, 825.34, 340/426; 235/380, 492; 381/86; 455/186.1, 345, 347, 348, 349; 307/10.5

[56] References Cited

U.S. PATENT DOCUMENTS

| | | |
|---|---|---|
| 5,001,775 | 3/1991 | Hayashi et al. ............ 455/186.1 |
| 5,049,728 | 9/1991 | Rovin ......................... 235/492 |
| 5,285,055 | 2/1994 | Oonakahara et al. . | |
| 5,548,163 | 8/1996 | French ........................ 307/10.2 |
| 5,781,123 | 7/1998 | Koenig et al. ............... 455/345 |

FOREIGN PATENT DOCUMENTS

0329513A1 8/1989 European Pat. Off. .
0344524A1 12/1989 European Pat. Off. .

Primary Examiner—Brian Zimmerman
Assistant Examiner—Yves Dalencourt
Attorney, Agent, or Firm—Jacobson, Price, Holman & Stern, PLLC

[57] ABSTRACT

An integrated circuit type car audio system can be operated at a general mode or an IC card mode. In the integrated circuit type car audio system, comparator compares a password number stored in the integrated circuit card which is loaded on said system with a reference password number. Mode select section generates a general mode select signal or an integrated circuit card mode signal to select a general mode or an integrated circuit card mode when the stored password number in the integrated circuit card and the reference password number coincide with each other. Controller receives any of the mode select signals selected by the mode select section and generates a mode execute control signal according to the one mode signal selected, and discriminates whether the integrated circuit card is a corresponding card for performing functions of the system based on the comparison result of the comparator. Output circuit outputs information to indicate whether the loaded integrated circuit card is a corresponding card for performing functions of the system according to the discriminating result from the controller. Function circuit executes any mode selected by the mode select section in response to the mode execute control signal generated by the controller. According to the system, car audio functions can selectively be performed at a general mode or an IC card mode according to a user's need.

20 Claims, 5 Drawing Sheets

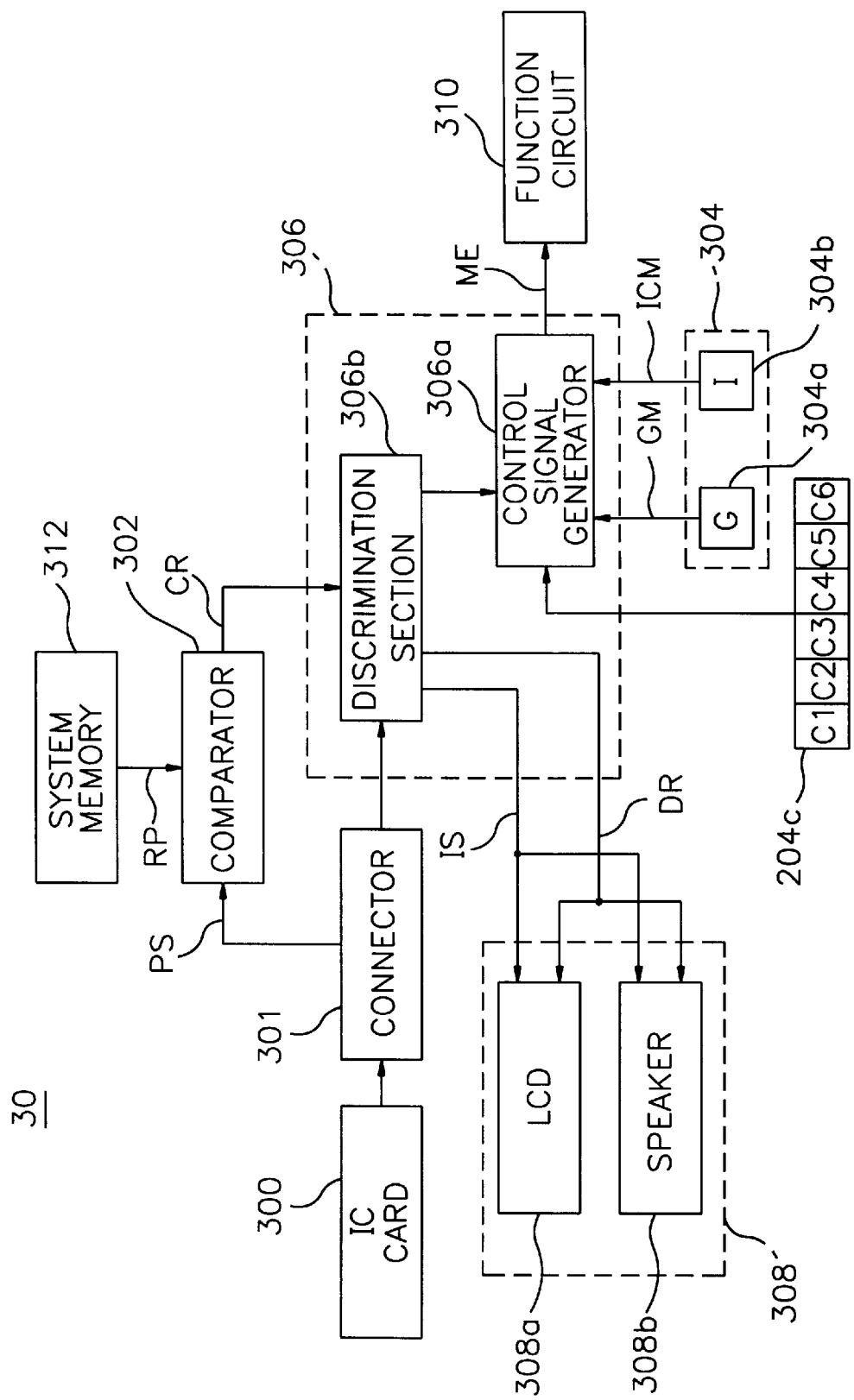

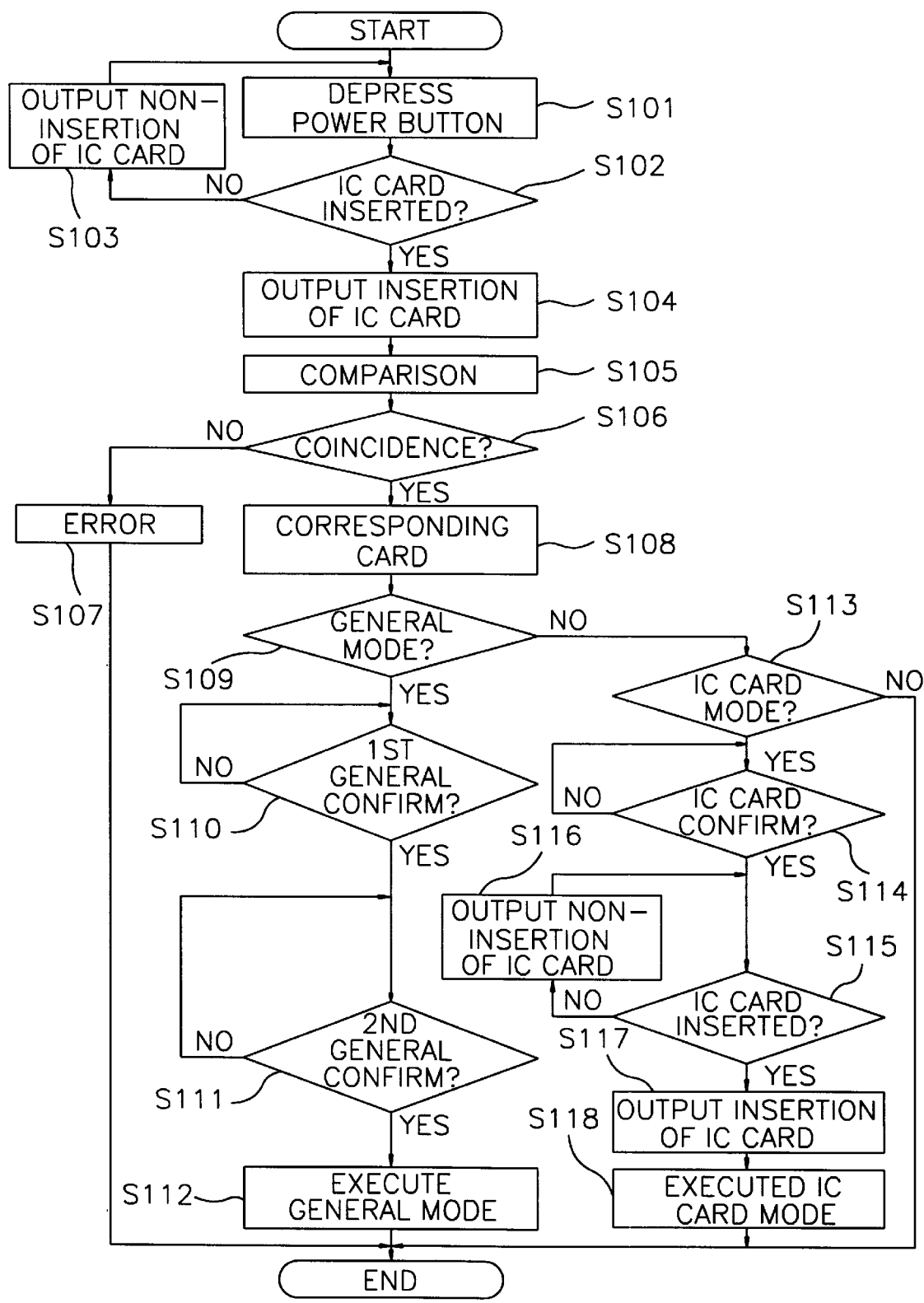

INTEGRATED CIRCUIT CARD TYPE CAR AUDIO SYSTEM AND OPERATING METHOD THEREOF

BACKGROUND OF THE INVENTION

1. Field of the Invention

The present invention relates to a car audio system, more particularly, to an integrated circuit (hereinafter referred to as "IC") type car audio system capable of being operated at a general mode or an IC card mode and an operating method thereof.

2. Description of the Prior Art

In general, a car audio system is installed on a control panel of all kinds of vehicles and serves to provide broadcasting or music to passengers therein. Since the car audio system is expensive and can be easily detached from the control panel, it has become the object of theft. In order to solve the above problems, a password number input device of a car audio system has been proposed.

FIG. 1 shows a conventional password number input device 10 of a car audio system. The conventional password number input device 10 of a car audio system includes a key input section 102 for inputting a password number, a decoder 104 for receiving the password number from the key input section 102 and converting the password number into a binary data signal, a microcomputer 106 for receiving the binary data signal from the decoder 104 and outputting a control signal based on the received binary data signal, and a memory 108 for storing the password number under control of the microcomputer 106.

An operation of the conventional password number input device 10 of the audio system will now be described. When a user inputs a password number by use of the key input section 102, the password number is inputted to the decoder 104. The decoder 104 receives the password number from the key input section and converts it into a binary data signal. The binary data signal is applied to the microcomputer 106. Accordingly, the microcomputer 106 receives the password number which is converted into the binary data signal from the decoder 104, outputs a write signal to the memory 108 and designates a corresponding address in the memory 108, and controls the memory 108 to store the password number in the designated address thereof.

In the conventional password input device 10 of the car audio system, a user should remember the password number. Further, since the user should input the password number every time he uses the car audio system, it is extremely inconvenient.

U.S. Pat. No. 5,285,055 (issued to Satoru Oonakahara and Murayama on Feb. 8, 1997) discloses IC card containing a CPU and a memory, for storing seat reservation data and read/write control method for controlling the operation of reading out data stored in a memory contained in the IC card and writing data into the memory. In the conventional IC card, a plurality of password numbers are previously stored and data can be read out from the IC card and written into the IC card when any one of the plurality of password numbers is input. Further, data readout and write-in with respect to the IC card are partially limited according to the input password number.

SUMMARY OF THE INVENTION

Therefore, it is an object of the present invention, for the purpose of solving the above mentioned problems, to provide an IC card type car audio system capable of being operated by means of a general key or an IC card in which a password number is stored and an operating method thereof.

In order to attain the object, according to the present invention, there is provided an integrated circuit card type car audio system, the system comprising:

a comparator for comparing a password number stored in the integrated circuit card which is loaded on said system with a reference password number;

a mode select section for generating a general mode select signal or an integrated circuit card mode signal so as to select a general mode or an integrated circuit card mode when the stored password number in the integrated circuit card and the reference password number coincide with each other;

a controller for receiving any of the mode select signals selected by the mode select means and generating a mode execute control signal according to the one mode signal selected, and discriminating whether the integrated circuit card is a corresponding card for performing functions of said system based on the comparison result of the comparator;

an output circuit for outputting information to indicate whether the loaded integrated circuit card is a corresponding card for performing functions of said system according to the discriminating result from the controller; and a function circuit for executing any mode selected by the mode select means in response to the mode execute control signal generated by the controller.

There is also provided an operating method of an integrated circuit card type car audio system, the method comprising the steps of:

a) comparing a password number stored in the integrated circuit card which is loaded on said system with a reference password number;

b) discriminating whether the loaded integrated circuit card is a corresponding card for performing functions of said system based on the comparison result of the step a) and outputting the discriminating result;

c) generating a general mode select signal or an integrated circuit card mode signal so as to select a general mode or an integrated circuit card mode when the stored password number in the integrated circuit card with the reference password number coincide with each other;

d) receiving any of the mode select signals selected and generating a mode execute control signal according to the mode signal received; and e) executing the mode selected in the step c) in response to the mode execute control signal generated in the step d).

In accordance with the present invention, car audio functions can selectively be performed at a general mode or an IC card mode according to a user's need.

Other objects and further features of the present invention will become apparent from the detailed description when read in conjunction with the attached drawings.

BRIEF DESCRIPTION OF THE DRAWINGS

Other features and advantages of the present invention will become more apparent from the following description taken in connection with the accompanying drawings, wherein:

FIG. 5 is a block diagram of a circuitry configuration of the IC card type car audio system shown in FIGS. 2, 3, and 4; and FIG. 6 is a flow chart for illustrating an operating method of the IC card type car audio system shown in FIG. 5.

DESCRIPTION OF THE PREFERRED EMBODIMENT

The preferred embodiment of the present invention will hereinafter be described in detail with reference to the accompanying drawings.

Figure 1:
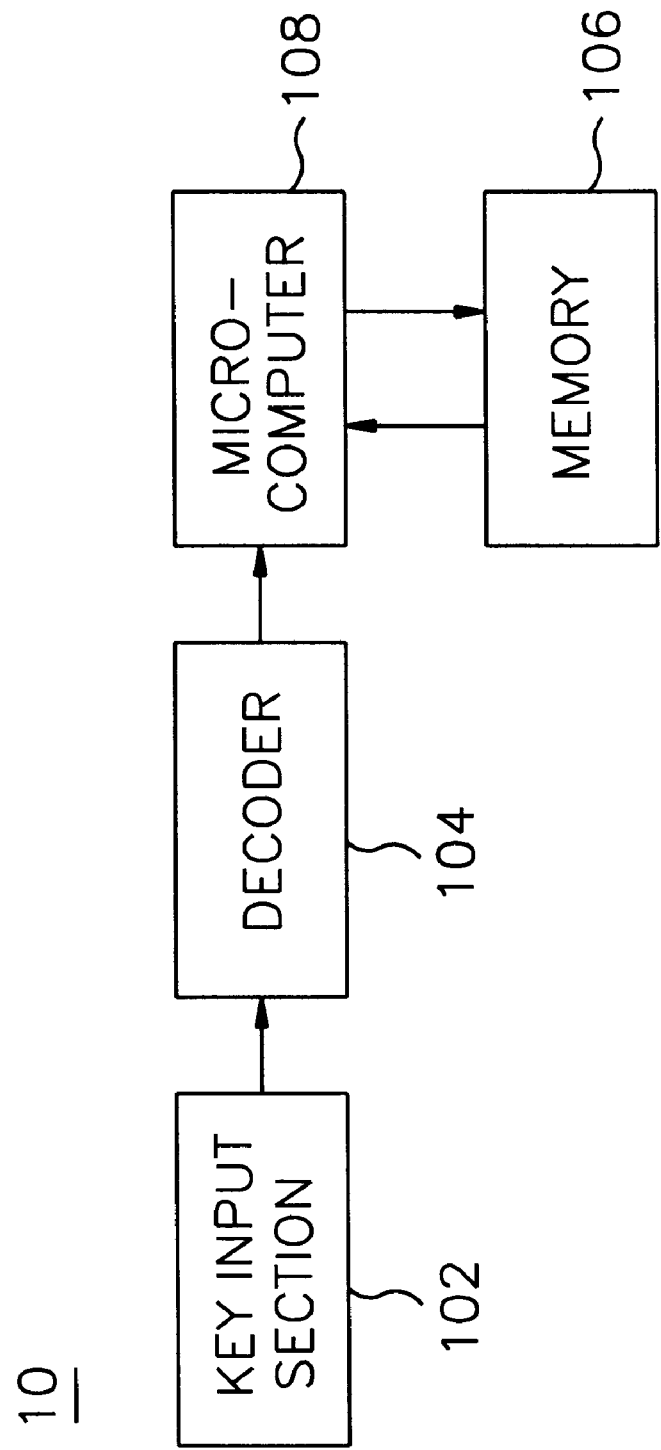
FIG. 1 is a block diagram for showing a conventional password number input device of a car audio system.
Figure 2:
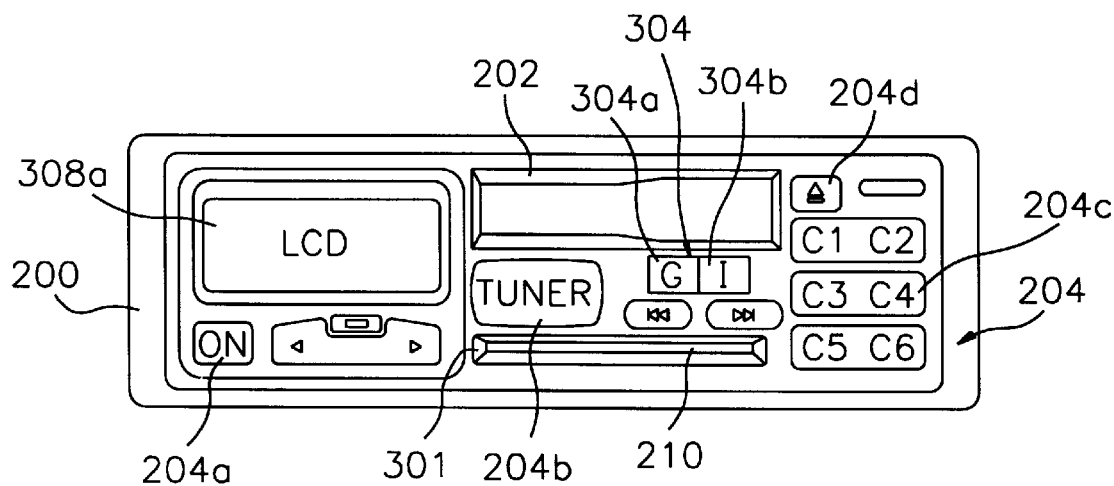
FIG. 2 is an elevation view for showing an IC card type car audio system according to an embodiment of the present invention.
Figure 3:
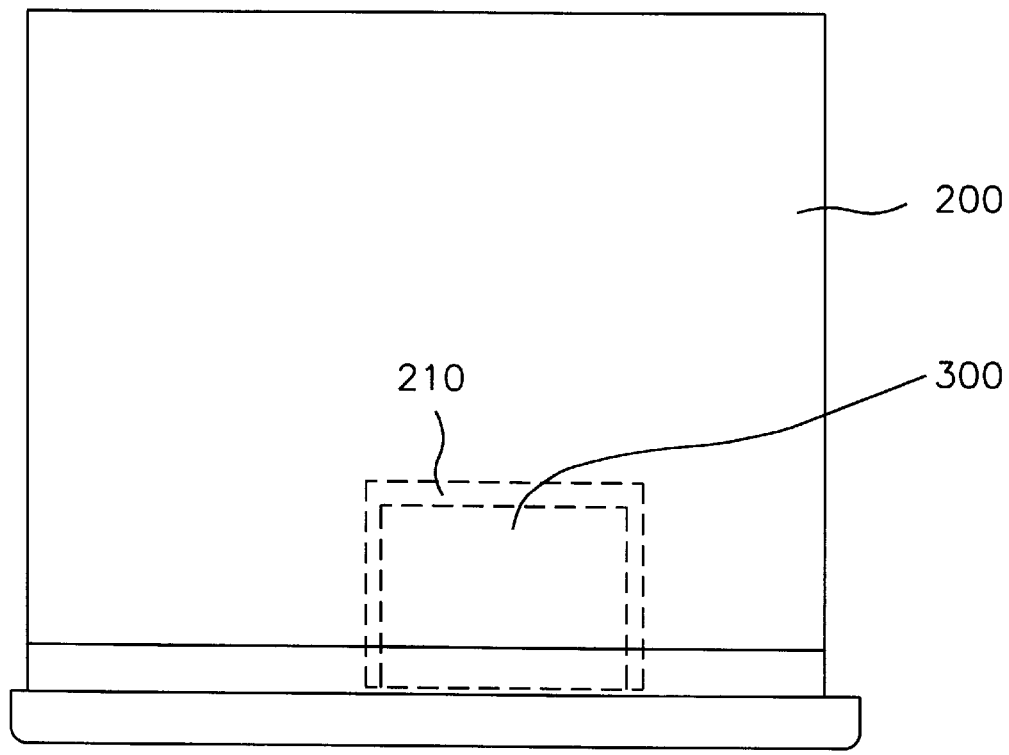
FIG. 3 is a plan view of the IC card type car audio system shown in FIG. 2.
Figure 4:
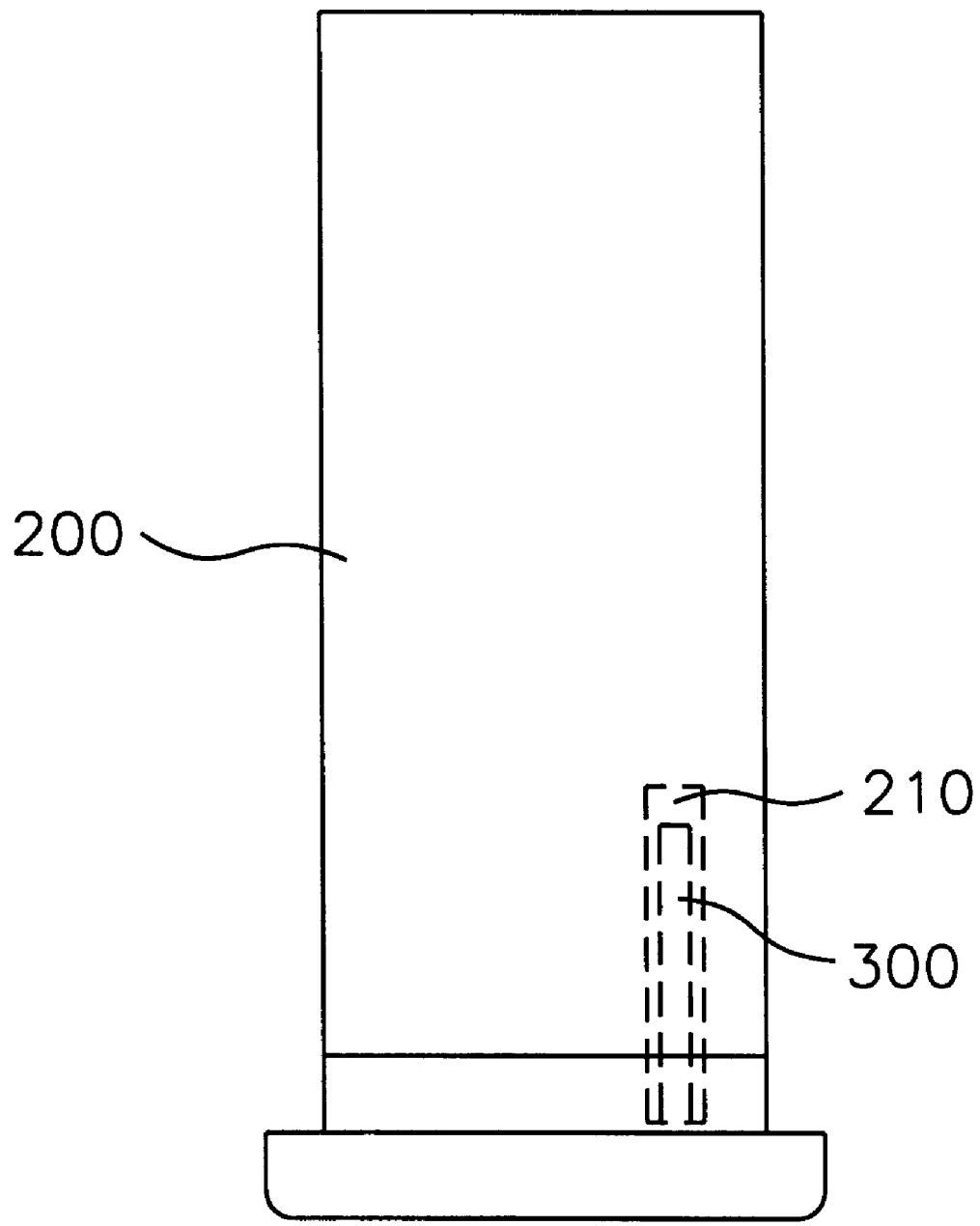
FIG. 4 is a side view of the IC card type car audio system shown in FIG. 3.

FIGS. 2, 3, and 4 show an IC card type car audio system according to an embodiment of the present invention. Reference numeral 200 represents a control panel of the IC card type car audio system. Reference numeral 202 represents a tape deck. Reference numeral 204 represents a general key input section including a power button 204a, a tuner button 204b, a channel select button 204c, and an eject button 204d. C1 is a first channel select and general mode confirm key, C2 is a second channel select and general mode confirm key, and C3 is a third channel select and IC card mode confirm key in the channel select button 204c in the channel select button 204c. Also, C4, C5, and C6 are third, fourth, and fifth channel select keys in the channel select button 204c. Reference numeral 304 represents a mode select section including a general mode select key 304a and an IC card mode select key 304b which will be described in detail hereinafter. Reference numeral 308a represents a liquid crystal display device (hereinafter referred to as "LCD") which will be described in detail hereinafter. Reference numerals 300 and 301 represent an IC card and a connector which will be described in more detail later. Reference numeral 210 represents a card slot.

FIG. 5 shows a circuitry construction of an IC card type car audio system according to an embodiment of the present invention. The IC card type car audio system 30 includes a comparator 302, a mode select section 304, a controller 306, an output circuit 308, and a function circuit 310. A connector 301 is mounted on the control panel 200 and electrically connects the IC card 200 to the control panel 200.

The comparator 302 is connected to the connector 301 and compares a password number PS which is stored in the IC card 300 with a reference password number RP and generates a comparison result signal. As a result of the comparison, when the password number PS stored in the IC card 300 and the reference password number RP coincide with each other, the comparator 302 generates a high level signal as the comparison result signal CR. Alternatively, when the password number PS stored in the IC card 300 and the reference password number RP are different from each other, the comparator 302 generates a low level signal as the comparison result signal CR. The comparison result signal CR of the comparator 302 is inputted to the controller 306. The comparison result signal CR from the comparator 302 is fed to the controller 306. The reference password number is a reference value to be used in order to discriminate whether or not the IC card 300 inserted into the connector 301 is a corresponding card for performing a function of the IC card type car audio system 30, which is specified by a user.

The mode select section 304 generates a general mode select signal GM or an integrated circuit card mode select signal ICM so as to select a general mode or an IC card mode when the stored password number in the IC card 300 and the reference password number coincide with each other in the comparison result of the comparator 302. The general mode represents a mode which executes car audio functions by means of a general key input section 204 of FIG. 2, and the IC card mode represents a mode which executes the car audio functions by means of an IC card 300. The mode select section 304 includes a general mode select key 304a for generating the general mode select signal GM in order to select the general mode by a user. The mode select section 304 also includes an IC card mode select key 304b for generating the IC card mode select signal ICM in order to select the IC card mode by a user.

The controller 306 includes a control signal generator 306a and a discrimination section 306B. The control signal generator 306a is connected to an output terminal of the mode select section 304 and receives any mode signal of the mode select signals selected by the mode select section 304 and generates a mode execute control signal ME according to the one mode select signal selected. The mode execute control signal ME is fed to the function circuit 308.

The discrimination section 306b is connected to the connector 301 and discriminates whether or not the IC card 300 is inserted into the connector 301 and generates an insertion state control signal IS according to a result of the discrimination. As the result of the discrimination, when it is discriminated that the IC card 300 is inserted into the connector 301, the discrimination section 306b generates a high level signal as the insertion state control signal IS. Alternatively, when the IC card 300 is not inserted into the connector 301, the first discrimination section 306b generates a low level signal as the insertion state control signal IS. The insertion state control signal IS is provide to an output circuit 308.

The discrimination section 306b also discriminates whether or not the IC card 300 is a corresponding card for performing functions of the IC card type car audio system 30 based on the comparison result signal CR from the comparator 302 when the IC card 300 is inserted into the connector 301 and generates a discriminating result signal DR. As the result of the discrimination of the discrimination section 306b, when the comparison result signal CR of the comparator 302 is in a high level, the discrimination section 306b generates a high level signal as the discriminating result signal DR. Alternatively, when the comparison result signal CR is in a low level, the discrimination section 306b generates a low level signal. The discriminating result signal DR is fed to the output circuit 308.

The output circuit 308 is connected to an output terminal of the discrimination section 306b of the controller 306 and outputs information indicating an insertion state of the IC card 300 in response to the insertion state control signal IS from the discrimination section 306b of the controller so that a user can recognize the insertion state of the IC card 300. The output circuit 308 also outputs information to indicate whether or not the IC card 300 inserted into the connector 301 is a corresponding card for performing functions of the IC card type car audio system 30 in response to the discriminating result signal DR from the discrimination section 306b so that the user can recognize whether or not the inserted IC card is the corresponding card. The output circuit 308 includes the LCD 308a and a speaker 308b.

The LCD 308a displays a character code indicating an insertion state of the IC card 300 in response to the insertion state control signal IS from the discrimination section 306b. When a high level signal is applied to the LCD 308a as the insertion state control signal IS, the LCD 308a displays a character indicating an insertion of the IC card 300. Alternatively, when a low level signal is applied to the LCD 308a as the insertion state control signal IS, the LCD 308a displays a character code indicating a non-insertion of the IC card 300. The LCD 308a also displays a character code to indicate whether or not the IC card 300 inserted into the connector 301 is a corresponding card for performing functions of the IC card type car audio system 30 in response to the discriminating result signal DR from the discrimination section 306b. When a high level signal is applied to the LCD 308a as the discriminating result signal DR, the LCD 308a displays a character code indicating that the IC card inserted into the connector 301 is the corresponding card. Alternatively, when a low level signal is applied to the LCD 308a as the discriminating result signal DR, the LCD 310a displays an error character code indicating that the IC card 300 inserted into the connector 301 is not the corresponding card.

The speaker 308b generates a beep tone indicating that an insertion state of the IC card 300 in response to the insertion state control signal IS from the discrimination section 306b. When the high level signal is applied to the speaker 308b as the insertion state control signal IS, the speaker 308b generates a beep tone that indicating an insertion of the IC card 300. When the low level signal is applied to the speaker as the insertion state control signal IS, the speaker 308b generates a beep tone indicating that a non-insertion of the IC card 300. The speaker 308b generates a beep tone to indicate whether or not the IC card 300 inserted into the connector 301 is a corresponding card for performing functions of the IC card type car audio system 30 in response to the discriminating result signal DR from the discrimination section 306b. When the high level signal is applied to the speaker 308b as the discriminating result signal DR, the speaker 308b generates a beep tone indicating that the IC card inserted into the connector 301 is the corresponding card. Alternatively, when the low level signal is applied to the speaker 308b as the discriminating result signal DR, the speaker 308b generates a beep tone indicating that the IC card 300 inserted into the connector 301 is not the corresponding card.

The function circuit 310 is connected to an output terminal of the controller 306 and executes any mode selected by the mode select section 304 in response to the mode execute control signal ME generated by the control signal generator 306a of the controller 306. The IC card type car audio system 30 further includes a system memory 312 for storing the reference password number.

Hereinafter, an operating method of the IC card type car audio system according to an embodiment of the present invention will be described by referring to the accompanying drawings. FIG. 6 illustrates an operating method of the IC card type car audio system shown in FIG. 5.

In step S101, when a power button 314 is depressed, the IC card type car audio system 30 is turned on. Then, in step S102, the controller 306 discriminates whether or not an IC card 30 is loaded on the IC card type car audio system 30, that is, whether or not the IC card 30 is inserted into the connector 301 of the IC card type car audio system 30 by a user. According to the result of the discrimination in step S102, when it is discriminated that the IC card 301 is detached from the connector 301, the LCD 310a displays a character code and the speaker 310b generates a beep tone which indicates that the IC card 300 is detached from the connector 301, respectively, under a control of the controller 306 in step S103, and then the routine returns to the step S101. On the contrary, when the IC card 300 is inserted into the connector 301, the LCD 310a displays a character code and the speaker 310b generates a beep tone which indicates that the IC card 300 is inserted into the connector 301, respectively, under a control of the controller 306 in step S104. Accordingly, when the IC card 300 is inserted into the connector 301, the IC card 300 is electrically connected to the IC card type car audio system 30.

In step S105, the comparator 304 compares a password number which is stored in the IC card 300 with a reference password number which is stored in a system memory 312. The comparison result of the comparator 304 is fed to the discrimination section 306b. Then, in step S106, the controller 306 checks whether or not the password number of the IC card 300 and the reference password number coincide with each other based on the comparison result in step S105. As a result of the check in step S106, when it is checked that the password number which is stored in the IC card 300 and the reference password number do not coincide with each other, the controller 306 effects an error process by causing the LCD 310a to display an error message and by causing the speaker 310b to generate a beep tone indicating that the inserted IC card 300 is not a corresponding card for performing functions of the IC card type car audio system 30 (step S107), respectively, and then the routine is terminated. On the contrary, when the password number of the IC card 300 and the reference password number coincide with each other, the LCD 310a displays a predetermined character code and the speaker 310b generates a predetermined beep tone indicating that the inserted IC card 300 is the corresponding card for performing functions of the IC card type car audio system 30 under of the controller 306 (step S108).

Then, the controller 306 checks whether or not a general mode is selected by the input of the general mode select key 304a in the mode select section 304 in step S109. As the result of the check in step S109, when it is checked that the general mode is selected, the controller 306 checks whether or not a first general mode confirm key C1 is inputted by the user in step S110. As the result of the check in step S110, when it is checked that the first channel select and general mode confirm key C1 of the general key input section 204 is not inputted, the step S110 is repeated until the first channel select and general mode confirm key C1 is not inputted. On the contrary, when the first general mode confirm key C1 is inputted, the controller 306 checks whether or not a second channel select and general mode confirm key C2 is inputted by the user in step S111. As the result of the check in step S111, when it is checked that the second channel select and general mode confirm key C2 is not inputted thereto, the step S111 is repeated until the second channel select and general mode confirm key C2 is inputted. On the contrary, when the second channel select and general mode confirm key C2 is inputted, the function circuit 308 executes a variety of car audio functions using a general key irrespective of an insertion state of the IC card 30 under a control of the controller 306 in step S112.

On the other hand, as the result of the check in step S109, when the general mode is not selected, the controller 306 judges whether or not an IC card mode is selected by an input of an IC card mode key 302b of the mode select section 302 in step S113. As the result of the judgement in step S113, when it is judged that the IC card mode is not selected, the routine is completed. On the contrary, when the IC card mode is selected, the controller 306 judges whether or not a third channel and IC card mode confirm key C3 is repressed in step S114. As the result of the judgement in step S114, when it is judged that the third channel and IC card mode confirm key C3 is not repressed, the step S114 is repeated until the third channel and IC card mode confirm key C3 is inputted. On the contrary, when the third channel and IC card mode confirm key C3 is repressed, the controller 306 judges whether or not the IC card 300 is inserted into the connector 301 in step S115.

As the result of the judgement in step S115, when it is judged that the IC card 300 is not inserted into the connector 301, the LCD 310a displays a character code and the speaker 310 generates a beep tone which indicates a non-insertion of the IC card 300, under the control of the controller 306 in step S116, and then the routine returns to the step S115. On the contrary, when the IC card 300 is inserted into the connector 301, the LCD 310a displays a character code and the speaker 310b generates a beep tone which indicates an insertion of the IC card 300, under a control of the controller 306 in step S117. Thereafter, the controller 306 sets an IC card mode of the IC card type car audio system 30 so that the function circuit 308 performs car audio functions according to the IC card mode (step S118).

In accordance with the present invention as mentioned, car audio functions can selectively be performed at a general mode or an IC card mode according to a user's need.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An integrated circuit card type car audio system comprising:
    a comparator for comparing a password number stored in the integrated circuit card which is loaded on said car audio system with a reference password number;
    a mode select means for generating a general mode select signal or an integrated circuit card mode signal so as to select a general mode or an integrated circuit card mode of said car audio system when the stored password number in the integrated circuit card and the reference password number coincide with each other;
    a controller for receiving any of the mode select signals selected by the mode select means and generating a mode execute control signal according to the one mode signal selected, and discriminating whether the integrated circuit card is a corresponding card for performing functions of said system based on the comparison result of the comparator;
    an output circuit for outputting information to indicate whether the loaded integrated circuit card is a corresponding card for performing functions of said system according to the discriminating result from the controller; and
    a function circuit for executing any mode selected by the mode select means in response to the mode execute control signal generated by the controller.

2. The integrated circuit card type car audio system as set forth in claim 1, wherein the mode select means includes a general mode select key for generating the general mode select signal so as to select the general mode.

3. The integrated circuit card type car audio system as set forth in claim 1, wherein the mode select means includes an integrated circuit card mode select key for generating the integrated circuit card mode select signal so as to select the integrated circuit card mode.

4. The integrated circuit card type car audio system as set forth in claim 1, wherein according to whether the stored password number in the integrated circuit card loaded on said system and the reference password number coincide with each other, the controller discriminates whether the integrated circuit card is the corresponding card for performing the functions of said system.

5. The integrated circuit card type car audio system as set forth in claim 1, wherein the controller discriminates whether the integrated circuit card is loaded on said system.

6. The integrated circuit card type car audio system as set forth in claim 1, wherein the controller includes a control signal generator for receiving any of the mode select signals selected by the mode select means and generating a mode execute control signal according to the one mode signal selected.

7. The integrated circuit card type car audio system as set forth in claim 1, wherein the controller includes a discrimination section for discriminating whether the integrated circuit card is a corresponding card for performing functions of said system based on the comparison result of the comparator.

8. The integrated circuit card type car audio system as set forth in claim 1, wherein the output circuit includes a liquid crystal display device for displaying a character code to indicate whether the integrated circuit card is the corresponding card for performing functions of said system according to the discriminating result from the controller.

9. The integrated circuit card type car audio system as set forth in claim 1, wherein the output circuit includes a speaker for generating a beep tone to indicate whether the integrated circuit card is the corresponding card for performing functions of said system in response to the discriminating result signal from the discrimination section.

10. The integrated circuit card type car audio system as set forth in claim 1, further comprising a system memory for storing the reference password number.

11. An integrated circuit card type car audio system comprising:
    a comparator for comparing a password number stored in the integrated circuit card which is loaded on said car audio system with a reference password number;
    a mode select means for generating a general mode select signal or an integrated circuit card mode signal so as to select a general mode or an integrated circuit card mode of said car audio system when the stored password number in the integrated circuit card and the reference password number coincide with each other;
    an integrated circuit card mode select key for generating the integrated circuit card mode select signal so as to select the integrated circuit card mode of said car audio system when the stored password number in the integrated circuit card and the reference password number coincide with each other;
    a control signal generator for receiving any of the mode select signals selected by the mode select means and generating a mode execute control signal according to the one mode signal selected;
    a discrimination section for discriminating whether the integrated circuit card is a corresponding card for performing functions of said car audio system based on the comparison result of the comparator;
    a liquid crystal display device for displaying a character code to indicate whether the loaded integrated circuit card is a corresponding card for performing functions of said car audio system according to the discriminating result from the discrimination section; and a function circuit for executing any mode selected by the mode select means in response to the mode execute control signal generated by the discrimination section.

12. The integrated circuit card type car audio system as set forth in claim 11, wherein according to whether the stored password number in the integrated circuit card loaded on said system and the reference password number coincide with each other, the discrimination section discriminates whether the integrated circuit card is the corresponding card for performing the functions of said system.

13. An operating method of an integrated circuit card type car audio system, said method comprising the steps of:

a) comparing a password number stored in the integrated circuit card which is loaded on said system with a reference password number;

b) discriminating whether the loaded integrated circuit card is a corresponding card for performing functions of said car audio system based on the comparison result of step a) and outputting the discriminating result;

c) generating a general mode select signal or an integrated circuit card mode signal so as to select a general mode or an integrated circuit card mode of said car audio system when the stored password number in the integrated circuit card with the reference password number coincide with each other;

d) receiving any of the mode select signals selected and generating a mode execute control signal according to the mode signal received; and e) executing the mode selected in step c) in response to the mode execute control signal generated in step d).

14. The operating method of an integrated circuit card type car audio system as set forth in claim 13, the reference password number is a reference value to be used in order to discriminate whether the integrated card loaded on the system is a corresponding card for performing functions of the system.

15. The operating method of an integrated circuit card type car audio system as set forth in claim 13, further comprising the step of:

loading the integrated circuit card on the system in order to electrically connect the integrated circuit card to the system, prior to step a).

16. The operating method of an integrated circuit card type car audio system as set forth in claim 15, wherein the step of loading the integrated circuit card on the system includes checking whether the integrated circuit card is loaded on the system; and outputting a loading state of the integrated circuit card according to the check result.

17. The operating method of an integrated circuit card type car audio system as set forth in claim 13, wherein the step a) includes the steps of:

a-1) comparing the password number stored in the integrated circuit card with the reference password number; and a-2) checking whether the password number stored in the integrated circuit card and the reference password number coincide with each other based on a result of the comparison in step a-1).

18. An operating method of an integrated circuit card type car audio system, said method comprising the steps of:

i) loading the integrated circuit card on the system in order to electrically connect the integrated circuit card to the system, ii) comparing a password number stored in the integrated circuit card which is loaded on said system with a reference password number;

iii) discriminating whether the loaded integrated circuit card is a corresponding card for performing functions of said car audio system based on the comparison result of step ii) and outputting the discriminating result;

iv) generating a general mode select signal or an integrated circuit card mode signal so as to select a general mode or an integrated circuit card mode of said car audio system when the stored password number in the integrated circuit card with the reference password number coincide with each other;

v) receiving any of the mode select signals selected and generating a mode execute control signal according to the any one mode signal received; and vi) executing the mode selected in step iv) in response to the mode execute control signal generated in step v).

19. The operating method of an integrated circuit card type car audio system as set forth in claim 18, wherein the step i) includes i-1) checking whether the integrated circuit card is loaded on the system; and i-2) outputting a loading state of the integrated circuit card according to the check result of step i-1).

20. The operating method of an integrated circuit card type car audio system as set forth in claim 18, wherein step ii) includes the steps of:

ii-1) comparing the password number stored in the integrated circuit card with the reference password number; and ii-2) checking whether the password number stored in the integrated circuit card and the reference password number coincide with each other based on a result of the comparison in step ii-1).

* * * * *